United States Patent
Yatabe

(10) Patent No.: US 6,260,702 B1
(45) Date of Patent: *Jul. 17, 2001

(54) CASSETTE ACCOMMODATION CASE

(75) Inventor: Kazumoto Yatabe, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/348,270

(22) Filed: Jul. 7, 1999

(30) Foreign Application Priority Data

Jul. 9, 1998 (JP) .................................. P10-194605

(51) Int. Cl.⁷ .................................................. B65D 85/575
(52) U.S. Cl. ...................... 206/387.1; 206/493; 206/478; 206/1.5
(58) Field of Search ................................ 206/493, 387.1, 206/478, 480, 387.13, 1.5, 473, 475; 242/597.5

(56) References Cited

U.S. PATENT DOCUMENTS

| | | |
|---|---|---|
| 3,664,492 | 5/1972 | Wallace . |
| 3,876,071 * | 4/1975 | Neal et al. .......................... 206/387.1 |
| 4,067,629 * | 1/1978 | Amatsu et al. ....................... 206/493 |
| 4,304,331 * | 12/1981 | Minkow .............................. 206/387.1 |
| 4,322,000 * | 3/1982 | Struble ................................ 206/387.1 |
| 4,406,369 | 9/1983 | Wallace et al. . |
| 5,165,541 * | 11/1992 | Morita ................................. 206/387.1 |
| 5,282,536 * | 2/1994 | Sato et al. ........................... 206/387.1 |
| 5,373,941 * | 12/1994 | Morita ................................. 206/387.1 |
| 5,499,714 * | 3/1996 | Konno .............................. 206/387.13 |
| 5,503,272 * | 4/1996 | Morita ................................. 206/387.1 |
| 5,518,116 * | 5/1996 | Morita ................................. 206/387.1 |
| 5,586,654 * | 12/1996 | Katagiri et al. ................... 206/387.1 |
| 5,775,500 * | 7/1998 | Williams ............................ 206/387.1 |
| 5,913,423 * | 6/1999 | Sasaki ............................. 206/387.12 |

FOREIGN PATENT DOCUMENTS

| | | |
|---|---|---|
| 0 493 845 A2 | 7/1992 | (EP) . |
| 0 506 173 A1 | 9/1992 | (EP) . |
| 0 872 841 A1 | 10/1998 | (EP) . |
| 2 306 498 | 10/1976 | (FR) . |
| 2 508 222 | 12/1982 | (FR) . |
| 2 231 861 | 11/1990 | (GB) . |
| 98 01369 | 1/1998 | (WO) . |

* cited by examiner

*Primary Examiner*—Shian Luong
(74) *Attorney, Agent, or Firm*—Ronald P. Kananen; Rader, Fishman & Grauer

(57) ABSTRACT

In a cassette accommodate case having such a structure that a cassette is accommodated by being laterally inserted from an inserting mouth portion provided on one side surface thereof, the rotation stopping projecting tabs which engage with hubs in the cassette to prevent the rotation thereof are provided and are capable of rising and falling, in order to prevent the hubs from unnecessarily rotating rotation stopping projecting tabs. With the cassette accommodation case according to the present invention, the rotation stopping projecting tabs are each comprised by parallelly providing two tabs as a set in a cassette inserting direction. Due to the arrangement, in a case where one tab of the rotation stopping projecting tabs does not revert to an erect state and resultantly does not engage with the hubs, another tab engages with the hubs, thereby making it possible to surely prevent the hubs from unnecessarily rotating.

8 Claims, 15 Drawing Sheets

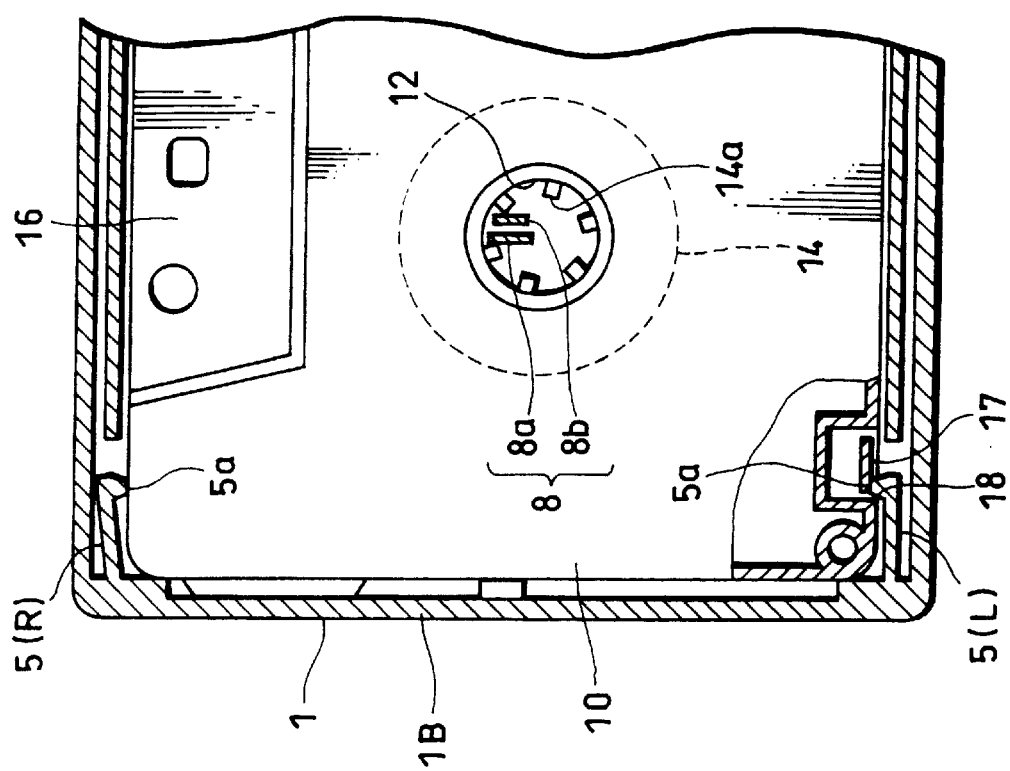
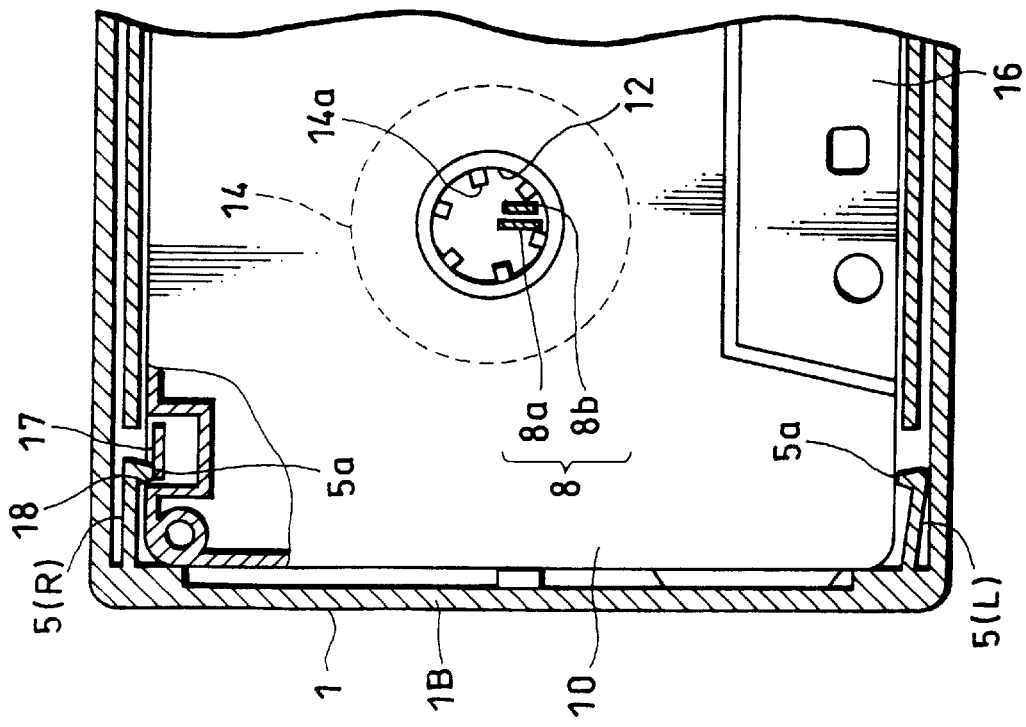

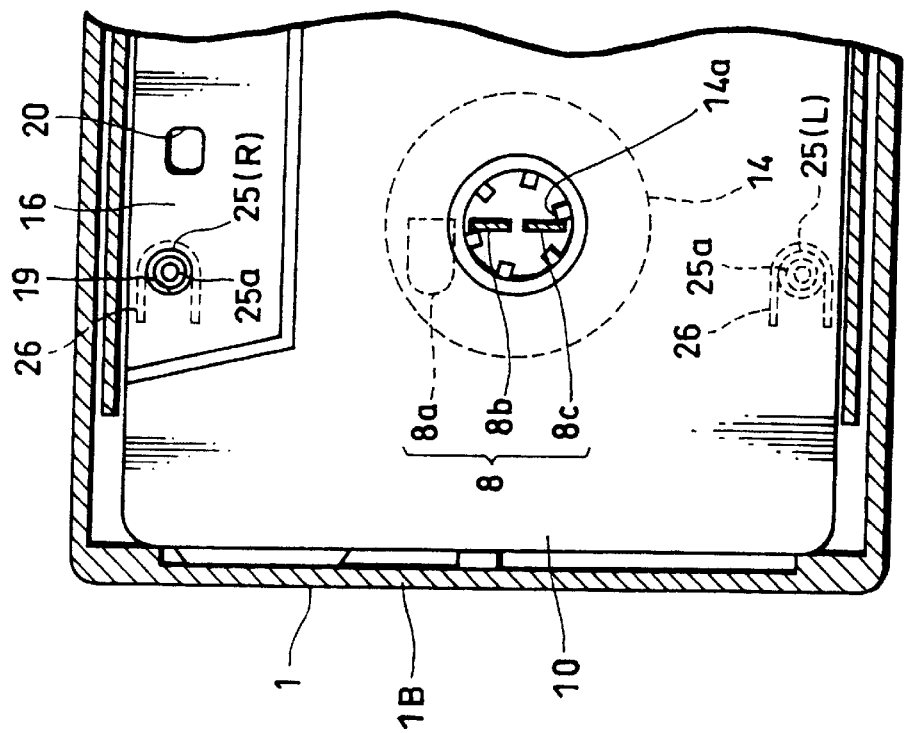
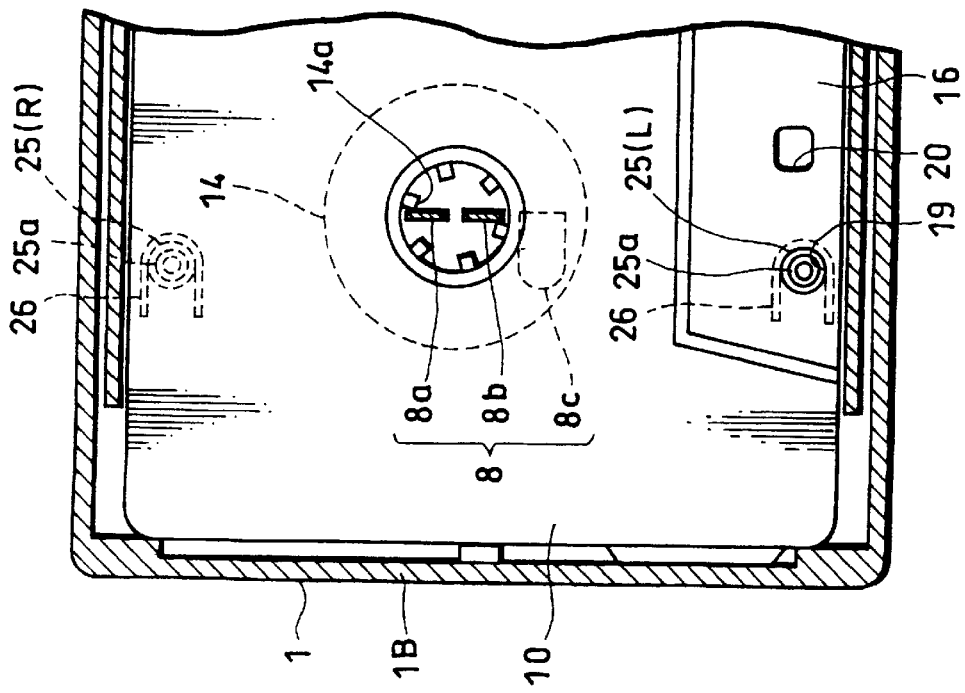

CASSETTE ACCOMMODATION CASE

BACKGROUND OF THE INVENTION

1. Field of the Invention

The present invention relates to a cassette accommodation case suited for accommodating a tape cassette such as, for example, an audio compact cassette and the like and particularly, to a cassette accommodation case of a slide type for accommodating a tape cassette by laterally inserting the tape cassette from an inserting mouth portion provided on one side thereof.

2. Description of the Related Art

In recent years, in a cassette accommodation case for accommodating and keeping an audio compact cassette, a cassette accommodating case of a slide type for laterally inserting a cassette from an inserting mouth portion provided on one side thereof has been practiced.

The structure of the conventional cassette accommodation case of side type will be shown in FIG. 1 to FIG. 5.

In FIGS. 1 to 5, reference numeral 1 indicates a cassette accommodation case 1 and an audio compact cassette (hereafter, referred to simply as a cassette) 10 is accommodated in the cassette accommodation case 1 by being laterally inserted from an inserting mouth portion 2 provided on the one side thereof of the cassette accommodation case 1.

First of all, the structure of the cassette 10 will be explained. As shown in FIG. 1, there are formed hub driving shaft inserting holes 12 on the left and right of a cassette housing 11 of the cassette 10 and corresponding to the hub driving shaft inserting holes 12, a pair of hubs 14 for winding a magnetic tape 13 are rotatably accommodated inside the cassette housing 11.

On the front surface of the cassette housing 11 is formed an opening portion 15 through which the magnetic tape 13 is exposed, while inside the cassette housing 11, a tape transit path is formed in a way that the magnetic tape 13 led out from the hub (supplying side hub) 14 on one side is wound around the hub (takeup side hub) 14 on another side through the opening portion 15.

A magnetic head and the like are to be inserted in the opening portion 15 from a cassette deck side. In order to secure the thickness at a portion into which the magnetic head and the like are to be inserted, trapezoid shaped swelled portions 16 which swell to the upper and lower sides of both surfaces are formed at the front portion of the cassette housing 11.

The cassette accommodation case 1 into which the cassette 10 is inserted is structured by uniting an upper half 1A and a lower half 1B. The upper half 1A is a molded plastic product molded from, for example, GPPS (general purpose polystyrene) as its material and also, the lower half 1B is a molded plastic product molded from, for example, HIPS (impact-proof polystyrene) as its material. The upper half 1A and the lower half 1B are integrally united by means of ultrasonic-welding and the like while in a state of being united.

Then, the inserting mouth portion 2 is provided on one side surface side of the cassette accommodation case 1 with its surface being wholly opened, and the cassette 10 is laterally inserted into the cassette accommodation case 1 from the inserting mouth portion 2 in a sliding fashion.

The cassette accommodation case 1 is such that the cassette 10 is accommodated therein almost without any clearance. To this end, on the respective inner surfaces of the upper half 1A and the lower half 1B inside the cassette accommodation case 1, concave grooves 3a and 3b for escaping the swelled portions 16 of the cassette 10 are respectively formed in a lateral direction, that is, in a cassette inserting direction.

Also, nearly at a central portion of the upper half 1A of the cassette accommodation case 1, a long opening portion 4 of an oblong shape in the cassette inserting direction is formed. When the cassette 10 is to be taken out from the cassette accommodation case 1, the cassette 10 is pushed out by putting a finger (for example, a thumb) from the opening portion 4.

Further, a stopper tab 5 is provided inside the cassette accommodation case 1 so as to prevent the cassette 10 from unexpectedly jumping out from a state of the cassette 10 being accommodated in the cassette accommodation case 1.

The stopper tab 5 is integrally projectingly formed on the lower half 1B and an engaging convex portion 5a is provided at a tip end portion thereof. Then, in the state of the cassette 10 being accommodated in the cassette accommodation case 1, the engaging convex portion 5a of the stopper tab 5 is, as shown in FIG. 5, engaged with an edge of an aperture portion 18 in which an erroneous erasure protection detecting nail 17 for the cassette 10 is provided, which keeps the cassette 10 in a lightly locked state in the cassette accommodation case 1, thereby preventing the cassette 10 from unexpectedly jumping out (coming off) from the cassette accommodation case 1.

Further, a rotation stopping member 6 is equipped inside the cassette accommodation case 1 for preventing the magnet tape from becoming loose by blocking the unnecessary rotation of the hubs 14 in the cassette 10.

The rotation stopping member 6 is a molded plastic product molded from, for example, PP (polypropylene) as its material and is structured in a way that rotation stopping projecting tabs 8 corresponding to the hub driving shaft inserting holes 12 of the cassette 10 are projectingly formed on a base plate portion 7 to be capable of elastically rising and falling, and the base plate portion 7 is attached by being caulked and fixed to caulking projections 9 projectingly provided nearly at a central portion inside the lower half 1B.

Then, when the cassette 10 is inserted into the cassette accommodation case 1, the rotation stopping projecting tabs 8 are pushed down by the cassette 10. Further, when the cassette 10 is completely accommodated in the cassette accommodation case 1, since the hub driving shaft inserting holes 12 of the cassette 10 correspond to the rotation stopping projecting tabs 8, respectively, the rotation stopping projecting tabs 8 elastically each revert to an erect state and engage with engagement projecting tabs 14a on an internal circumference of the hubs 14 to block the rotation of the hubs 14.

With the above-mentioned conventional cassette accommodation case 1, because the rotation stopping projecting tabs 8 become a state of being pushed down every time the cassette 10 is pushed therein and pulled out therefrom, a so-called state of deformation due to fatigue occurs in the rotation stopping projecting tabs 8, and in that case, the rotation stopping projecting tabs 8 do not almost revert to a state of erection when the cassette 10 is completely accommodated and become a state of not engaging with the hubs 14, with the result that it becomes impossible to prevent the hubs 14 from unnecessarily rotating.

Also, in a case where the rotation stopping projecting tabs 8 erect incompletely, depending on circumstances, the tip ends of the rotation stopping projecting tabs 8 get stuck in a clearance between the hubs 14 and the hub driving shaft inserting holes 12 and get bent and folded, and as a result, in this case too, there is the loss of the function in preventing the hubs 14 from unnecessarily rotating.

SUMMARY OF THE INVENTION

The present invention is implemented in view of these problems and its object is to provide a cassette accommodation case capable of surely preventing the hub from unnecessarily rotating while the cassette is in a state of being accommodated therein.

In order to achieve the above-mentioned object, according to the present invention there is provided a cassette accommodation case which is so structured as to accommodate a cassette by laterally inserting the cassette from an inserting mouth portion provided on one side surface thereof and in which rotation stopping projecting tabs engaged with hubs of the cassette for preventing them from rotating are elastically provided that they are capable of rising and falling, and in which each of the rotation stopping projecting tabs is comprised of 2 tabs parallelly provided in an cassette inserting direction as a set.

With the cassette accommodation case according to the present invention, being structured in this fashion, even in a case where one of the rotation stopping projecting tabs does not engage with the hub because it does not revert to a state of erection or it gets bent and folded, it is possible to surely prevent the hub from unnecessarily rotating by engaging another tab with the hub.

BRIEF DESCRIPTION OF THE DRAWINGS

FIGS. 10A and 10B are each a cross-sectional plan view of the same in which the cassette is accommodated with its part being cut off;

FIG. 15, consisting of FIGS. 15A through 15B, is a transverse plan view partly in section showing a state that a cassette is housed in the cassette accommodation case of the present invention;

DESCRIPTION OF THE PREFERRED EMBODIMENT

Figure 1:
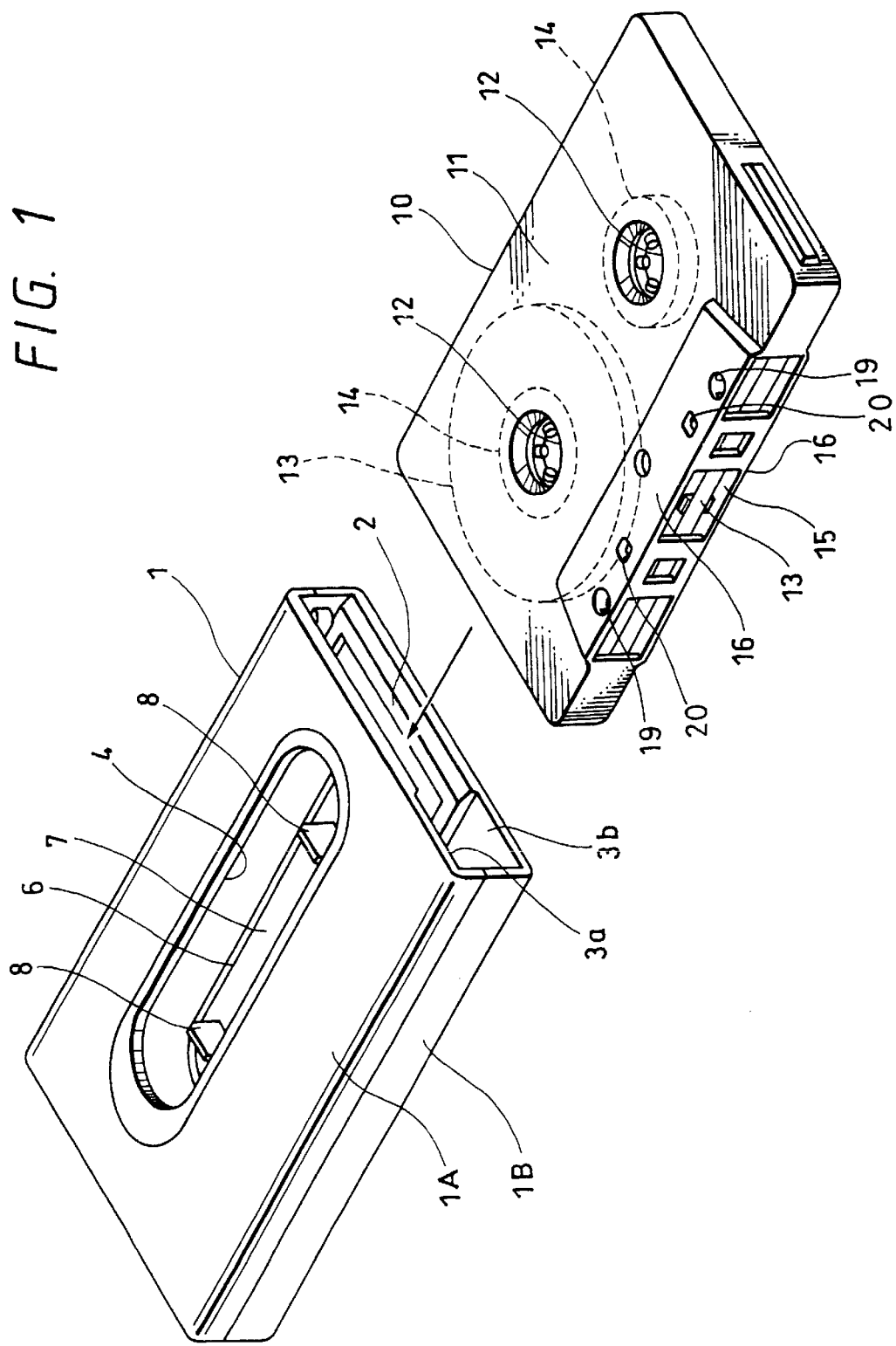
FIG. 1 is a perspective view of a cassette accommodation case of a conventional example.
Figure 2:
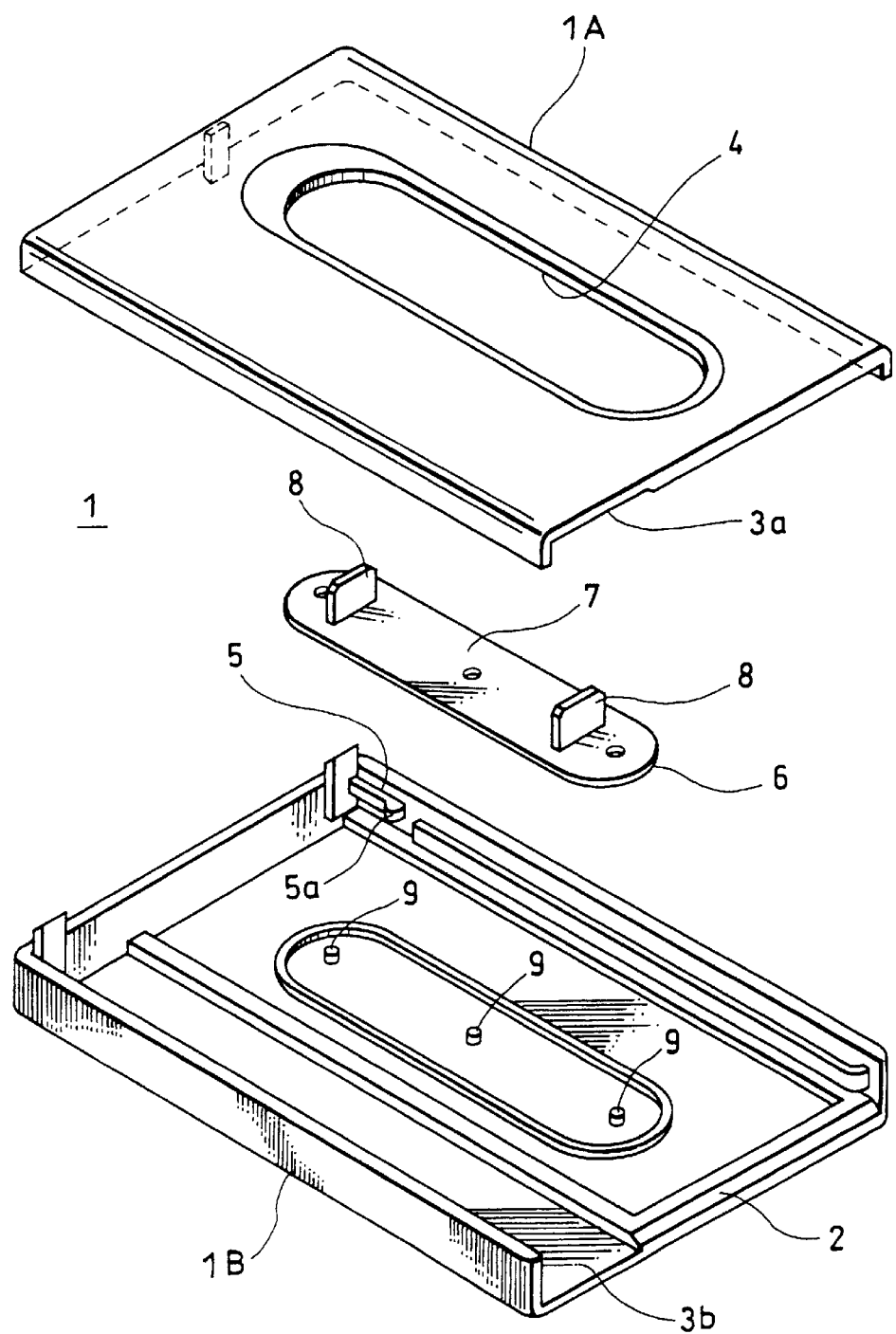
FIG. 2 is an exploded perspective view of the same.
Figure 3:
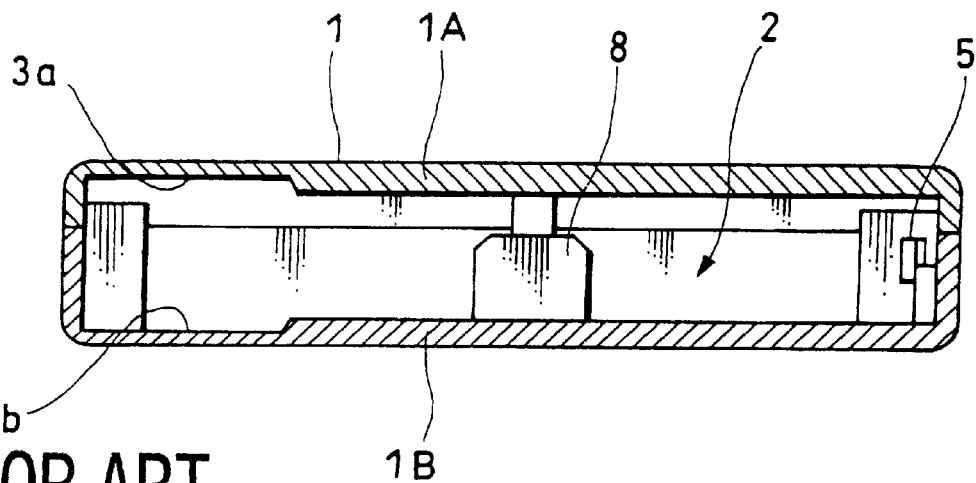
FIG. 3 is a side view of the same.
Figure 4:
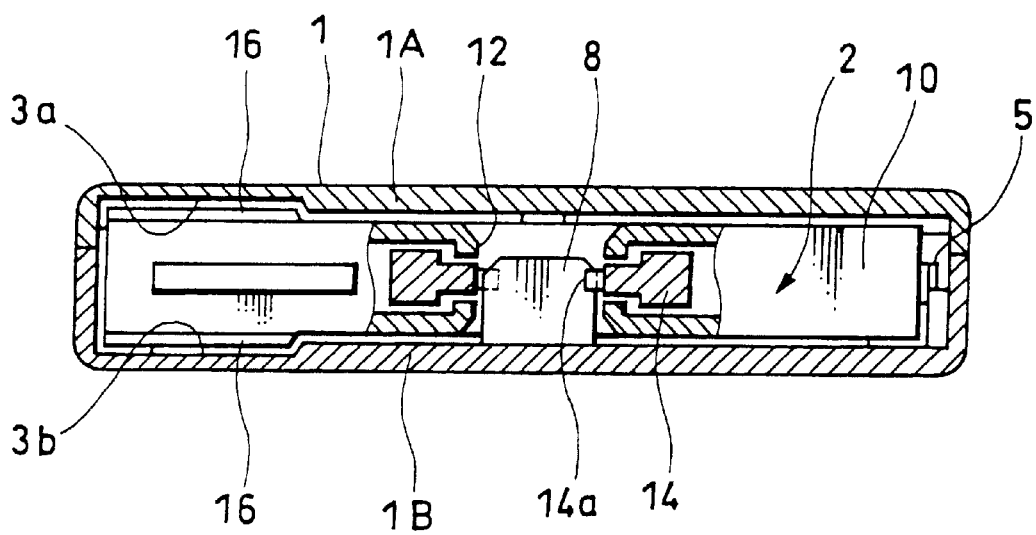
FIG. 4 is a side view of a cassette in a state of being accommodated in the same with its a part being cut off.
Figure 5:
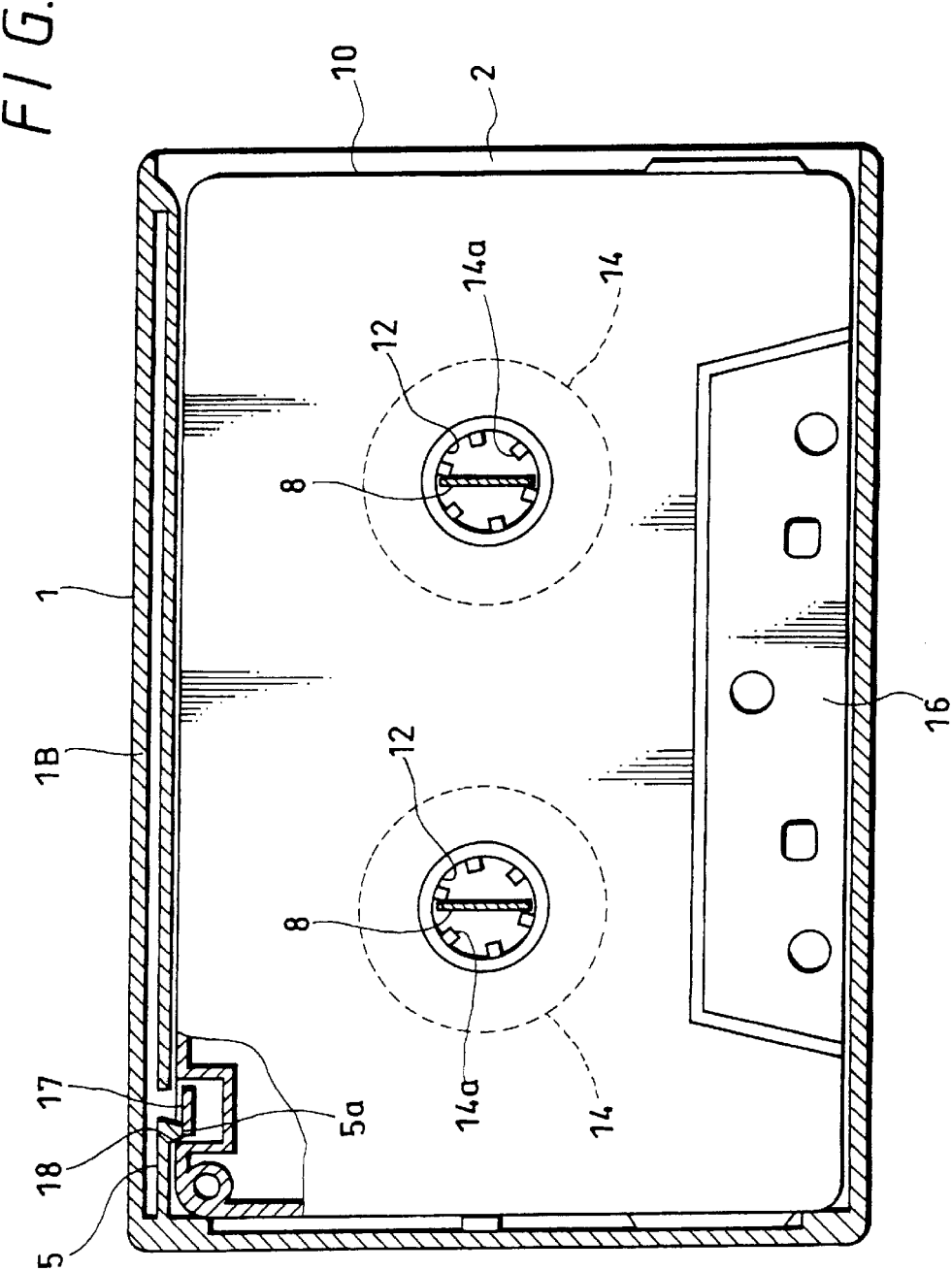
FIG. 5 is a cross-sectional view of the cassette in a state of being accommodated showing a part being cut off of the same.
Figure 6:
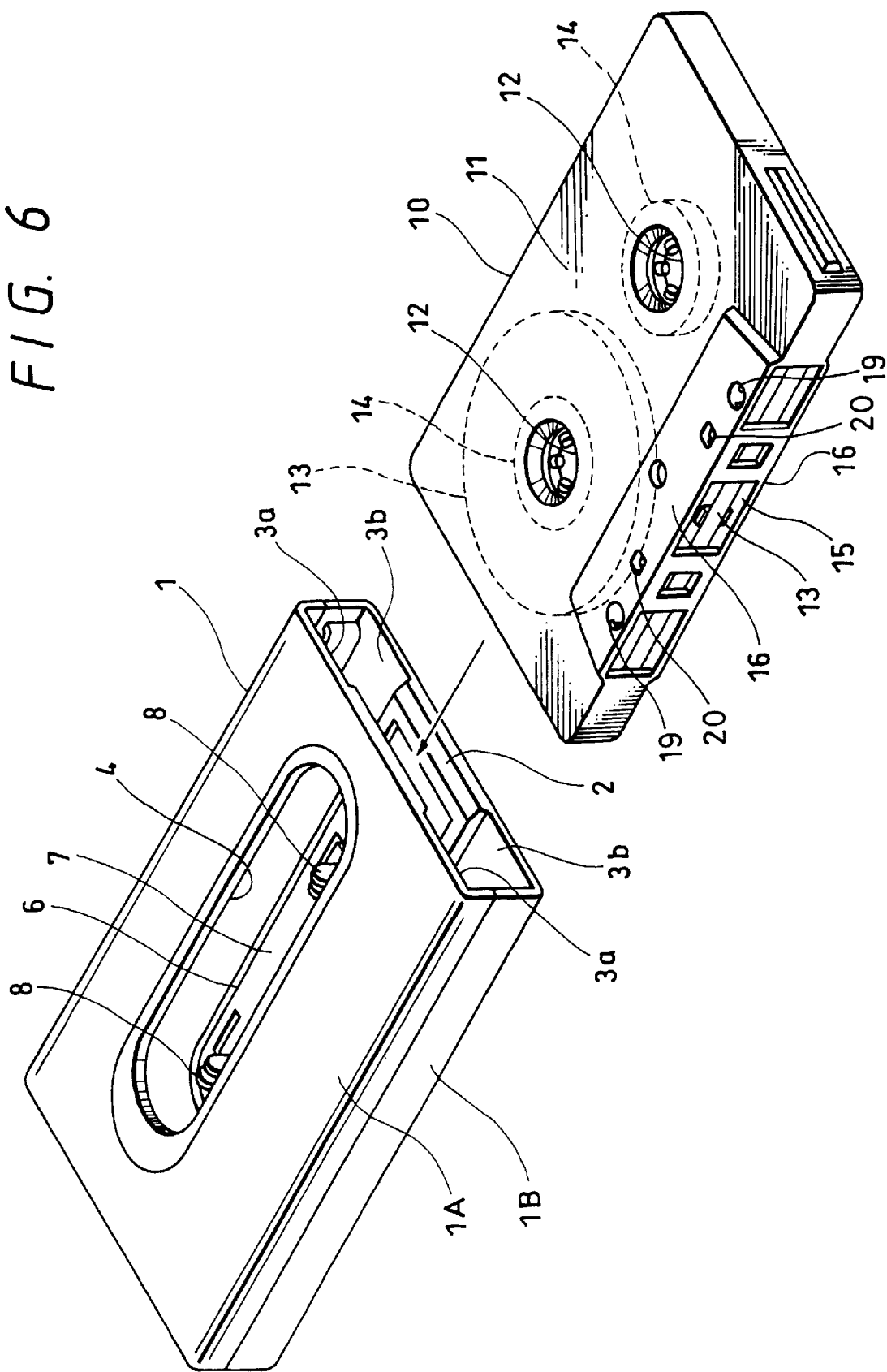
FIG. 6 is a perspective view showing an example of the cassette accommodation case according to the present invention.

Hereafter, one of the embodiment of the present invention will be explained in detail with reference to FIG. 6 to FIG. 11.

A fundamental structure of a cassette accommodation case shown in the embodiment is the same as that of the cassette accommodation case of the conventional example.

That is, a cassette accommodation case 1 of the present embodiment is comprised by uniting an upper half 1A and a lower half 1B. In this case, the upper half 1A is a molded plastic product molded from, for example, GPPS (general purpose polystyrene) as material and also, the lower half 1B is a molded plastic product molded from, for example, HIPS (impact-proof polystyrene) as material. The upper half 1A and the lower half 1B are further integrally united by means of ultrasonic-welding and the like in a state of being united.

Then, an inserting mouth portion 2 is provided on one surface side of the cassette accommodation case 1 with its surface being wholly opened, and a cassette 10 is laterally inserted into the cassette accommodation case 1 from the inserting mouth portion 2 in a sliding fashion.

The cassette accommodation case 1 is so formed that the cassette 10 is accommodated therein almost without any clearance. To this end, on the inner surface sides of the upper half 1A and the lower half 1B in the inside of the cassette accommodation case 1, concave grooves 3a and 3b for escaping the swelled portions 16 of the cassette 10 are respectively formed in a lateral direction, that is, in a cassette inserting direction.

Here, particularly, in the cassette accommodation case 1 of this example, the concave grooves 3a and 3b are provided symmetrically on both left and right sides of the cassette inserting direction, which leads to a structure in which the cassette 10 can be inserted in any orientations.

Figure 9A:
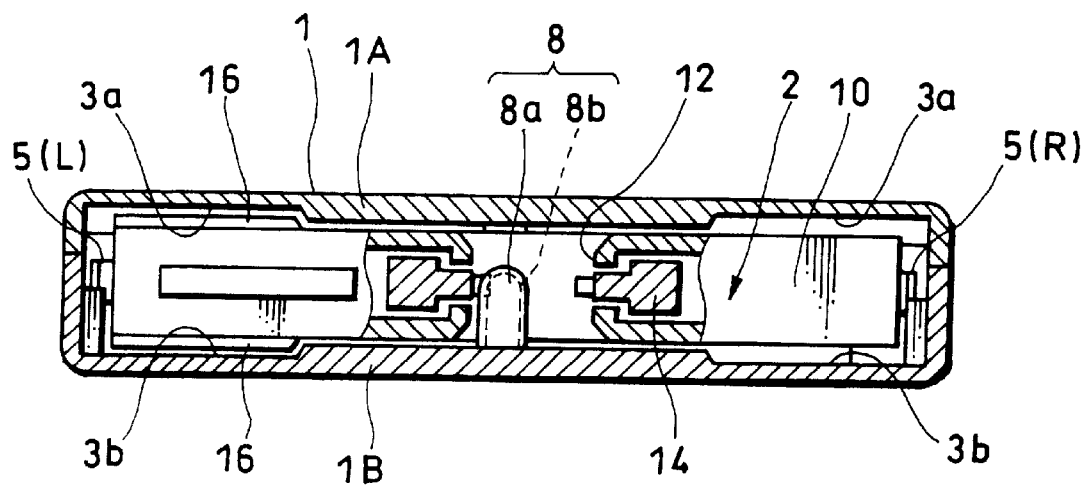
FIGS. 9A and 9B are each a side view of the same in which a cassette is accommodated with its part being cut off.
Figure 9B:
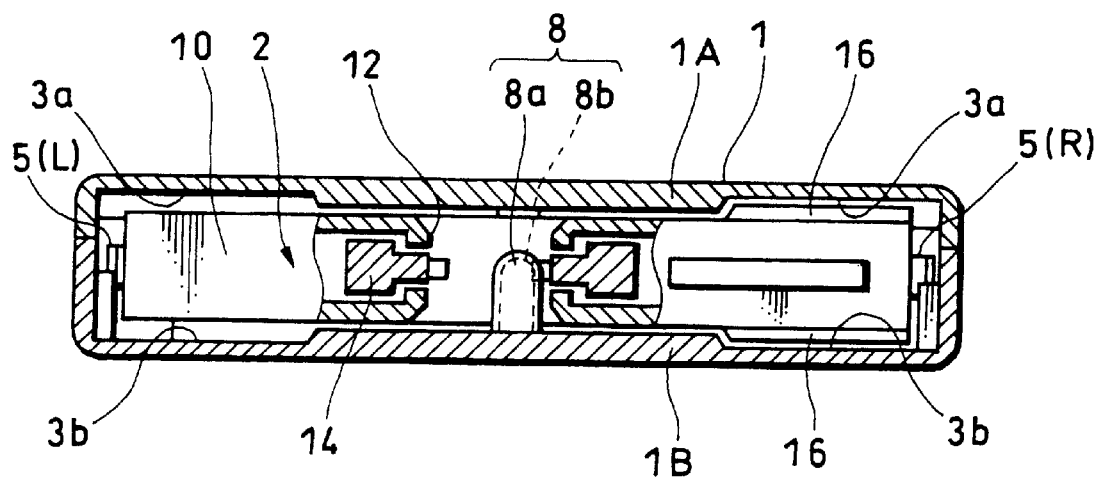
Figure 12:
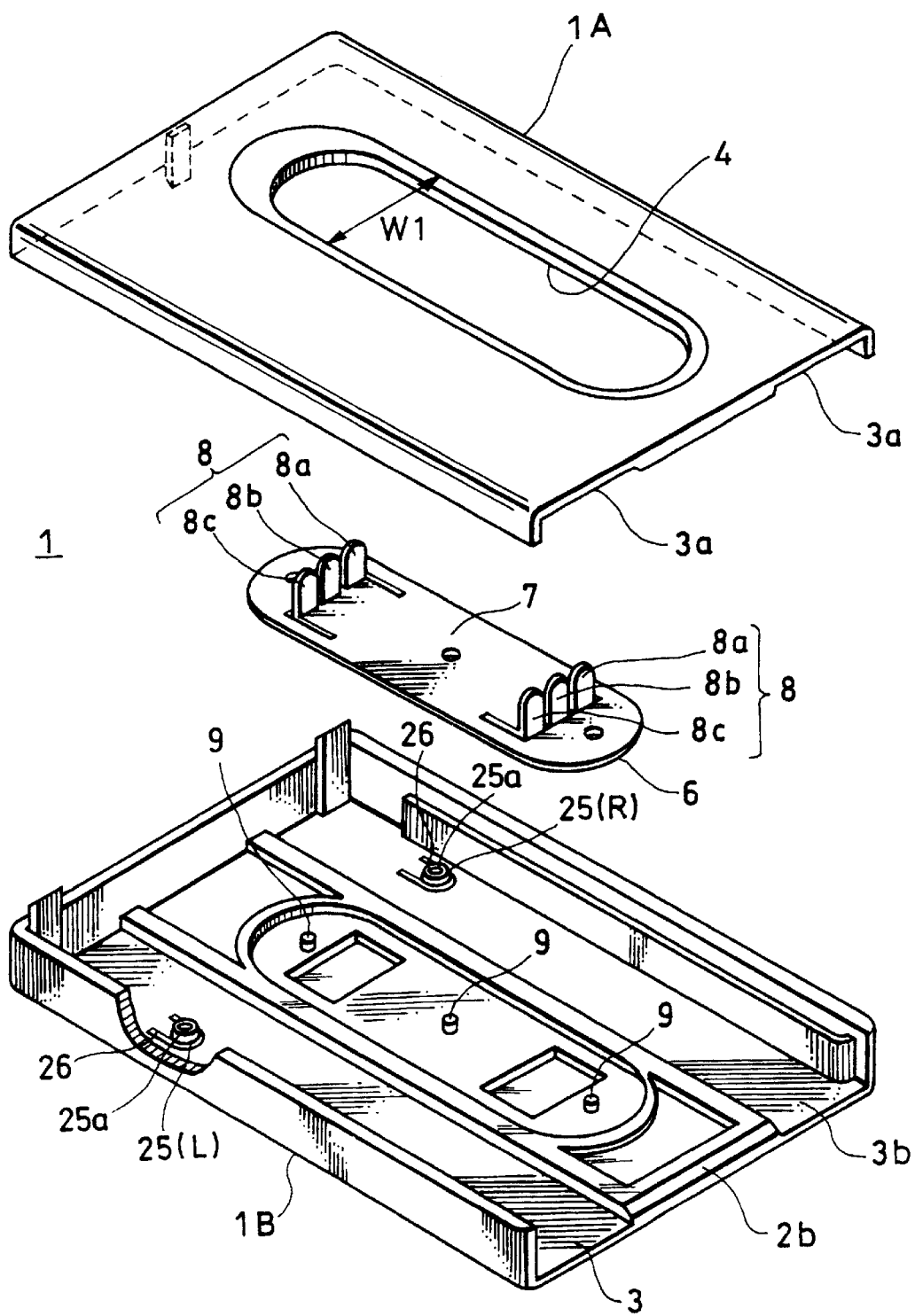
FIG. 12 is an exploded perspective view showing another embodiment of the cassette accommodation case of the present invention.
Figure 13:
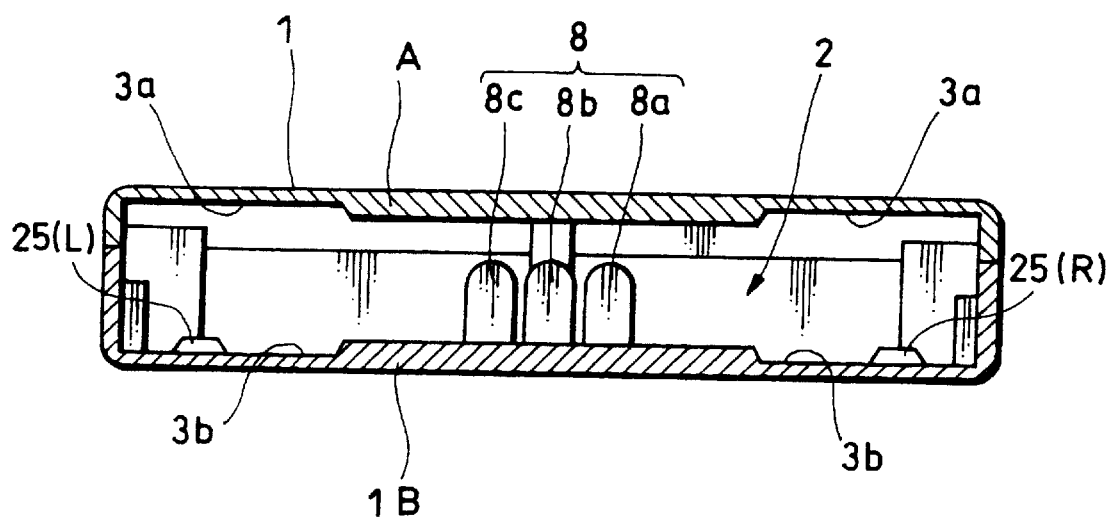
FIG. 13 is a side-sectional view showing the cassette accommodation case of the present invention.
Figure 14A:
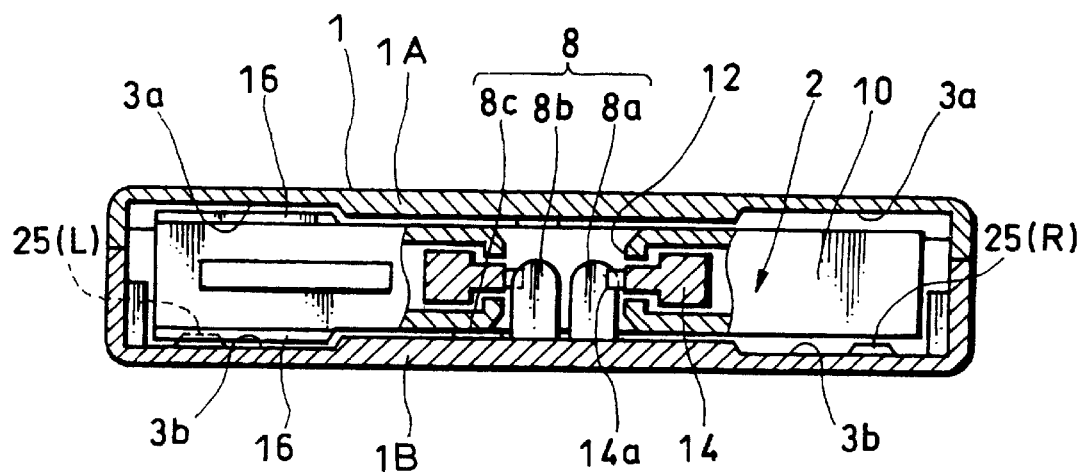
FIG. 14, consisting of FIGS. 14A through 14B, is a side view partly in section showing a state that a cassette is housed in the cassette accommodation case of the present invention.
Figure 14B:
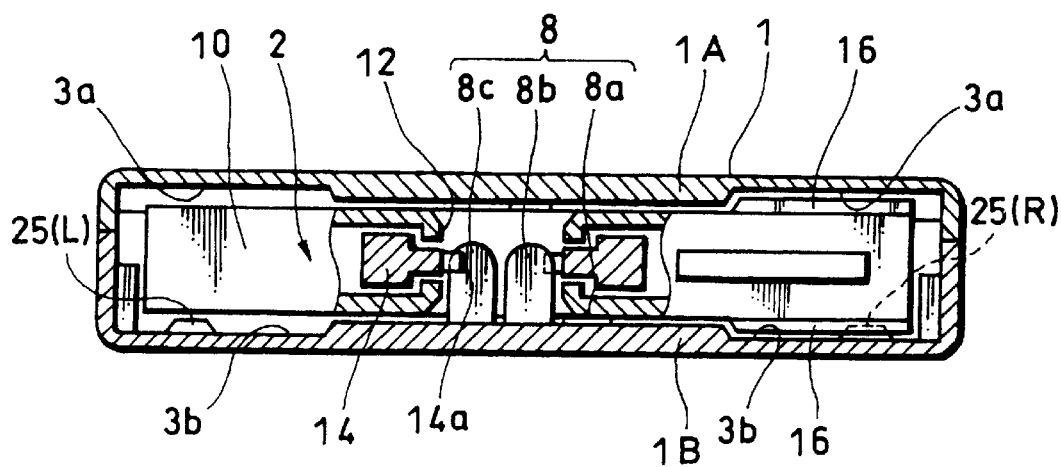

That is, FIG. 9A shows a state in which the cassette 10 is accommodated in the cassette accommodation case 1 in a way that the swelled portions 16 face the left side of the cassette inserting direction, while FIG. 9B shows a state in which the cassette 10 is accommodated in the cassette accommodation case 1 in a way that the swelled portions 16 face the right side of the cassette inserting direction and thus, by being able to insert and accommodate the cassette 10 in any orientations in the cassette accommodation case 1, a user doesn't have to ascertain the orientation of the cassette 10 every time he inserts the cassette 10, and can smoothly insert the cassette 10 at one time under whatever circumstances, e.g. in a dark place.

Also, in the cassette accommodation case 1, since molded portions of the concave grooves 3a and 3b are formed thin in thickness and the thin portions due to the concave grooves 3a and 3b exist on both the left and the right sides of the cassette inserting direction, the amount of used plastic as molding material is reduced as compared with the prior art, thereby making it possible to pare down costs by that amount as well as to achieve lightening.

Also, nearly at the central portion of the upper half 1A of the cassette accommodation case 1, an opening portion 4 of an oblong shape along the cassette inserting direction is formed. When the cassette 10 is to be taken out from the cassette accommodation case 1, the cassette 10 is pushed out by putting a finger (for example, a thumb) from the opening 4.

Further, a stopper tab 5 is provided inside the cassette accommodation case 1 so as to prevent the cassette 10 from unexpectedly jumping out in a state of the cassette 10 being accommodated therein.

The stopper tab 5 is integrally projectingly formed on the lower half 1B and an engaging convex portion 5a is provided at a tip end portion thereof. Then, in the state of the cassette 10 being accommodated in the cassette accommodation case 1, the engaging convex portion 5a of the stopper tab 5, as shown in FIGS. 10A and 10B, engages with an edge of an aperture portion 18 in which an erroneous erasure protection detecting nail 17 of the cassette 10 is provided, which keeps the cassette 10 in a lightly locked state in the cassette accommodation case 1, thereby preventing the cassette 10 from unexpectedly jumping out (coming off) from the cassette accommodation case 1.

Since the cassette accommodation case 1 of the present example has, as mentioned above, such a structure that the cassette 10 can be inserted in any orientations, corresponding thereto the stopper tab 5 is symmetrically provided as 5 (L), 5(R) on both the left and the right sides of the cassette inserting direction.

That is, FIG. 10A shows a state in which the cassette 10 is accommodated in the cassette accommodation case 1 in a way that the swelled portions 16 face the left side of the cassette inserting direction. In this case, the stopper tab 5 (R) on the right side of the cassette inserting direction engages with the aperture portion 18 of the cassette 10 to hold the cassette 10 (at this time, the stopper tab 5 (L) on the left side of the cassette inserting direction is escaping from the cassette 10 due to undergoing an elastic deformation).

Also, FIG. 10B shows a state in which the cassette 10 is accommodated in the cassette accommodation case 1 in a way that the swelled portions 16 face the right side of the cassette inserting direction. In this case, the stopper tab 5 (L) on the left side of the cassette inserting direction engages with the aperture portion 18 of the cassette 10 to hold the cassette 10 (at this time, the stopper tab 5 (R) on the right side of the cassette inserting direction is escaping from the cassette 10 due to undergoing the elastic deformation).

With the cassette accommodation case 1 of this embodiment as set forth above, in cases where the cassette case 10 is inserted thereinto in any orientations, the cassette 10 can surely be held in the cassette accommodation case 1 and prevented from jumping out of the cassette accommodation case 1.

Further, inside the cassette accommodation case 1, a rotation stopping member 6 is equipped for preventing the magnet tape from becoming loose by blocking unnecessary rotation of the hubs 14 in the cassette 10.

The rotation stopping member 6 is a molded plastic product molded from, for example, PP (polypropylene) as material and is structured such that rotation stopping projecting tabs 8 corresponding to the hub driving shaft inserting holes 12 of the cassette 10 are projectingly formed on the base plate portion 7 to be capable of elastically rising and falling. The base plate portion 7 is attached by being caulked and fixed to the caulking projections 9 projectingly provided nearly at a central portion of the inside of the lower half 1B.

Then, when the cassette 10 is inserted into the cassette accommodation case 1, the rotation stopping projecting tabs 8 are pushed down by the cassette 10. When the cassette 10 is completely accommodated in the cassette accommodation case 1, because the hub driving shaft inserting holes 12 of the cassette 10 correspond to the rotation stopping projecting tabs 8, respectively, the rotation stopping projecting tabs 8 elastically revert to the erect state and engage with engagement projecting tabs 14a on the internal circumference of the hubs 14 to block the rotation of the hubs 14. To remove the cassette 10, the thumb of the user is inserted into opening 4 to slide the cassette 10 from case 1, wherein elastic projecting tabs revert down as the cassette is slid over the projecting tabs causing the tabs to slide down due to its elastic nature.

Figure 7:
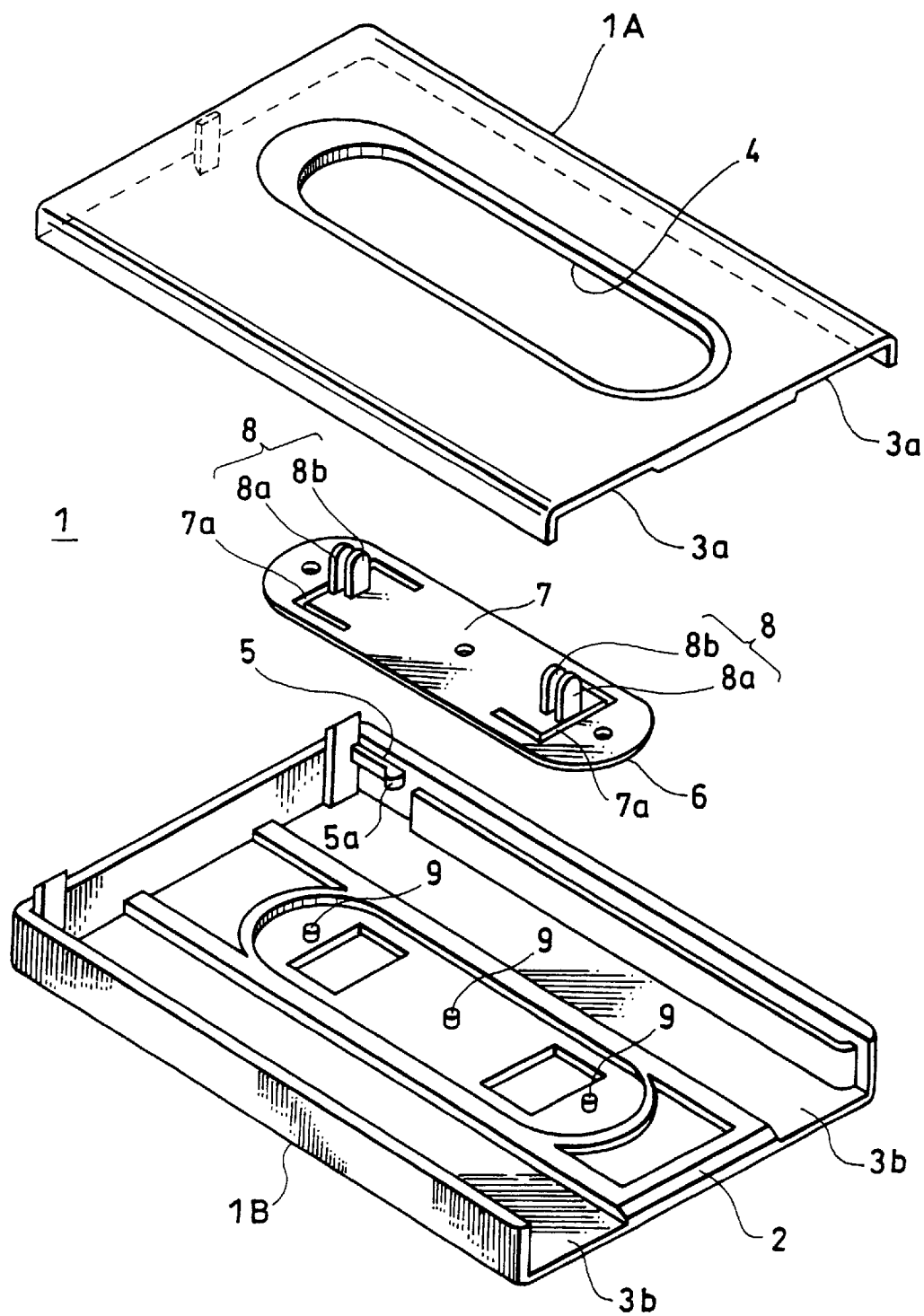
FIG. 7 is an exploded perspective view of the same.
Figure 8:
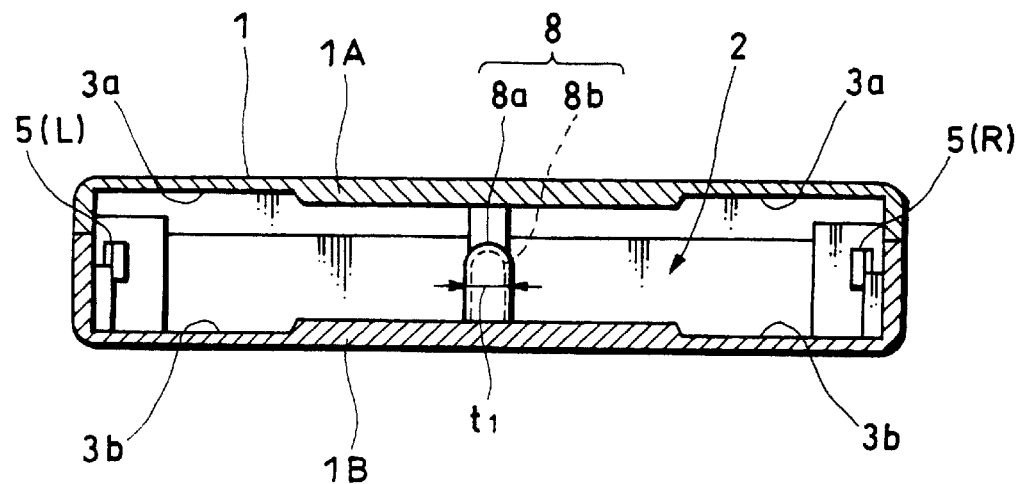
FIG. 8 is a side view of the same.

Also, as shown in FIG. 7, the base plate portion 7 of the rotation stopping member 6 is so constructed that U-letter shape cut-out grooves 7a are formed around the rotation stopping projecting tabs 8, so that when the rotation stopping projecting tabs 8 are pushed down by the cassette 10, portions surrounded by the cut-out grooves 7a bend downward to assist in the fall of the rotation stopping projecting tabs 8. Meanwhile, escaping concave portions corresponding to the cut-out grooves 7a are respectively provided on the inner surface side of the lower half 1B.

Particularly, in the rotation stopping member 6 of this example, each of the rotation stopping projecting tabs 8 is comprised of two tabs parallelly provided in the cassette inserting direction as a set.

That is, each of the rotation stopping projecting tabs 8 is comprised of a first tab 8a and a second tab 8b provided in line inside the first tab 8a. The second tab 8b is almost the same in shape as that of the first tab 8a and further, is formed a bit smaller in width as well as shorter in height than the first tab 8a. Also, the shapes of the tip end portions of both the first tab 8a and the second tab 8b are formed in a curved line state (an arc state).

Figure 11:
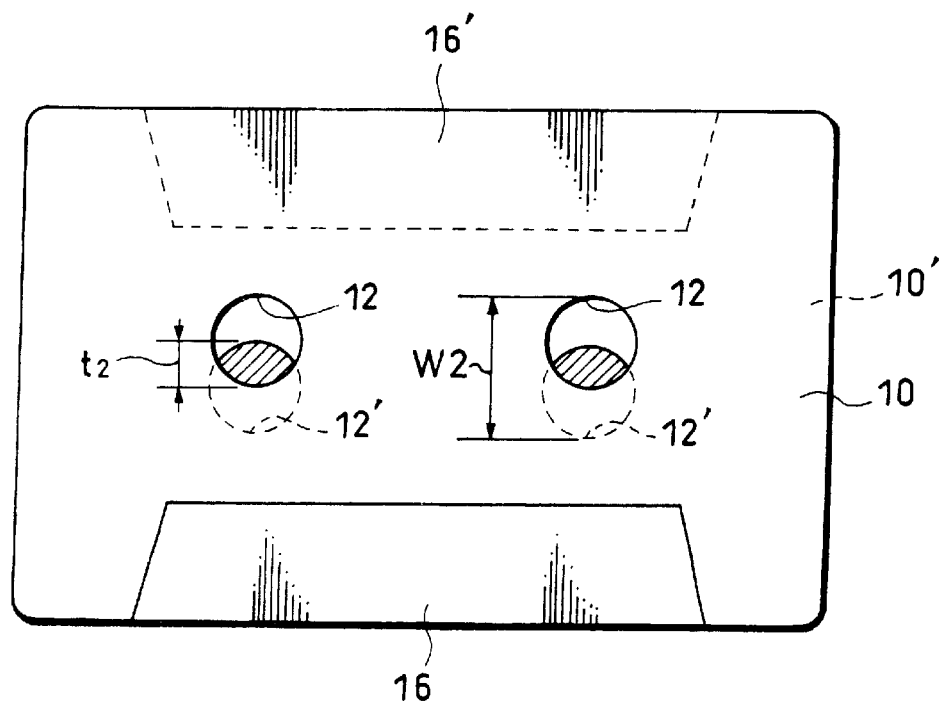
FIG. 11 is an explanatory diagram of two cassette being superposed to reversely face each other.

The rotation stopping projecting tabs 8 are both provided on the center line of the cassette inserting direction. In this case, a width $t_1$ of the first tab 8a is formed equivalent to or a bit smaller than a width $t_2$ of a common portion (a diagonally shaded portion) of the hub driving shaft inserting holes 12 and 12' when two cassettes 10 and 10' are superposed to reversely face each other as shown in FIG. 11.

Therefore, in a state of the cassette 10 being accommodated in the cassette accommodation case 1, in cases where the cassette 10 is inserted in any orientations, the rotation stopping projecting tabs 8 are inserted into the hub driving shaft inserting holes 12 to engage with the hubs 14.

That is, as shown in FIG. 9A and FIG. 10A, when the cassette 10 is accommodated in the cassette accommodation case 1 with the swelled portion 16 facing the left side of the cassette inserting direction, two tabs 8a and 8b of the rotation stopping projecting tabs 8 respectively stand erect, are inserted into the hub driving shaft inserting holes 12 of the cassette 10, and are engaged on their one side portions with the engaging projecting tabs 14a of the hubs 14 to block the unnecessary rotation of the hubs 14.

Also, as shown in FIG. 9B and FIG. 10B, even when the cassette 10 is in a state of being accommodated in the cassette accommodation case 1 with the swelled portions 16 facing the right side of the cassette inserting direction, two tabs 8a and 8b of the rotation stopping projecting tabs 8 stand erect, are inserted in the hub driving shaft inserting holes 12 of the cassette 10, and are engaged on their other side portions with the engaging projecting tabs 14a of the hubs 14 and block the rotation of the hubs 14.

In this way, with the cassette accommodation case 1 of the example, in cases where the cassette 10 is inserted in any orientations, the hubs 14 are prevented from unnecessarily rotating by the rotation stopping projecting tabs 8 as well as the magnetic tape is prevented from loosening.

Then, particularly, with the cassette accommodation case 1 of this example, the rotation stopping projecting tabs 8 of the rotation stopping member 6 are each comprised of two tabs 8a and 8b, and since the two tabs 8a and 8b simultaneously engage with the hubs 14, it is possible to surely prevent the hubs 14 from unnecessarily rotating.

Also, even in the case where one tab out of the two tabs 8a and 8b of the rotation stopping tabs 8 does not engage with the hubs 14 by not reverting to the erect state as well as being bent and folded , another tab stands erect to engage with the hubs 14 and hence, the hubs 14 are surely prevented from unnecessarily rotating.

Further, since the rotating stopping projecting tabs 8 are each comprised of the two tabs 8a and 8b, when the rotation stopping member 6 is fed by a part feeder in the assembly process for manufacturing the cassette accommodation case, the rotation stopping projecting tabs 8 never get stuck in cut-out grooves 7a of another rotation stopping member 6. Therefore, it is possible to prevent such an accident in which the part feeder is clogged with a plurality of the rotation stopping members piling one another therein, which is effective in terms of productivity.

Further, in the embodiment, since the tip end shapes of the two tabs 8a and 8b of the rotation stopping projecting tabs 8 are formed in a curved line state (an arc state), at times of the cassette 10 being inserted into (or being taken out from) the cassette accommodation case 1, even when the cassette 10 brushes by the tip end portions of the two tabs 8a and 8b of the rotation stopping projecting tabs 8, bruises are not easily attached on the surface of the cassette 10, which is effective in protecting the cassette.

One example of the embodiment of the present invention has been explained so far, but the present invention is not limited to the example.

For example, in the above-mentioned example, the case has been shown in which the present invention is applied to the cassette accommodation into which the cassette can be inserted in any orientations, but the present invention can also be applied to a cassette accommodation case shown in the prior art into which the cassette 10 can be inserted in only one orientation.

Further, as shown in FIGS. 12 to 17, the cassette accommodation case 1 is provided with a stopper member 25 for preventing the cassette 10 from suddenly jumping out in a state that the cassette 10 is housed therein.

The stopper member 25 is provided in the recess groove 3b formed on the lower half 1B of the cassette accommodation case 1 together with a U-shaped notch groove 26 formed on the lower half 1B. Further the stopper member 25 is provided with an engaging protrusion 25a which is engaged with a capstan shaft insertion hole 19 of the bulged portion 16 of the cassette 10, as will be described later, at the distal end portion of the groove 26.

Figure 16:
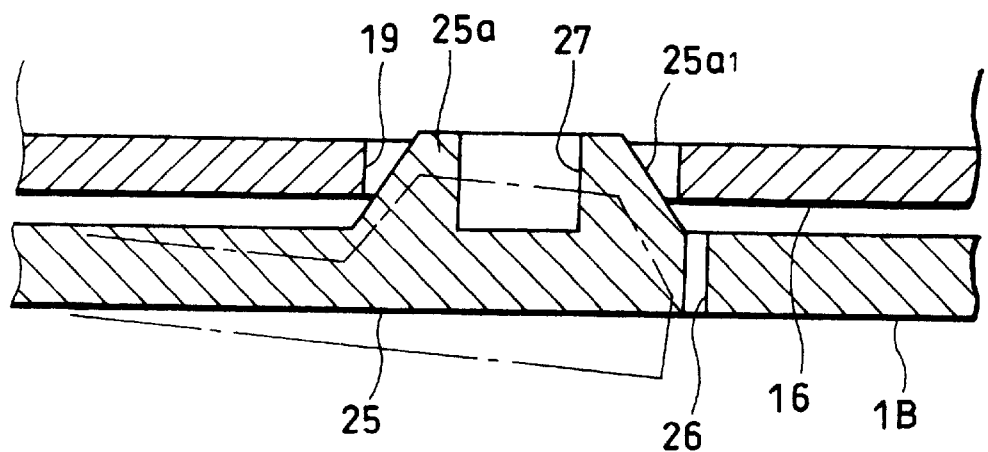
FIG. 16 is a partially longitudinal sectional view showing a stopper member.

As will be clear from FIG. 16, the engaging protrusion 25a of the stopper member 25 has a front or tip edge portion 25$a_1$ which is formed like an inclined surface (taper surface). Further, the engaging protrusion 25a is formed with a recess-like (concave) groove (hole) 27 at the top end central portion thereof.

When the cassette 10 is inserted into the cassette accommodation case 1, the stopper member 25 is once pushed down by the bulged portion 16 of the cassette 10, and thereafter, when the cassette 10 is fully inserted into the cassette accommodation case 1, the engaging protrusion 25a is engaged with the capstan shaft insertion hole 19 of the bulged portion 16 of the cassette 10 by a resilience (elastically rehousing force) of the stopper member 25. Thus, the cassette 10 is held in the cassette accommodation case 1 in a lightly locked state, so that the cassette 10 can be prevented from suddenly jumping out (slipping off) of the cassette accommodation case 1.

As described before, the cassette accommodation case 1 has a structure capable of inserting the cassette 10 regardless of directions of the cassette 10. To this end, the stopper member 25, that is, stopper members 25(L) and 25(R) are symmetrically formed on both right and left sides in the cassette inserting direction so as to correspond to the above structure.

More specifically, FIG. 15A shows a state that the bulged portion 16 is situated on the cassette inserting direction left side and that the cassette 10 is housed in the cassette accommodation case 1. In this case, the engaging protrusion 25a of the stopper member 25(L) on the cassette inserting direction left side is engaged with the capstan shaft insertion hole 19 of the cassette 10 so as to hold the cassette 10.

On the other hand, FIG. 15B shows a state that the bulged portion 16 is situated on the cassette inserting direction right side and that the cassette 10 is housed in the cassette accommodation case 1. In this case, the engaging protrusion 25a of the stopper member 25(R) on the cassette inserting direction right side is engaged with the capstan shaft insertion hole 19 of the cassette 10 so as to hold the cassette 10.

As described above, in the cassette accommodation case 1, even in the case where the cassette 10 is inserted thereinto from whichever directions, the cassette 10 is securely held in the cassette accommodation case 1 so as to prevent the cassette 10 from jumping out of the cassette accommodation case 1.

The cassette accommodation case 1 has a structure in which the stopper member 25 is formed in the recess groove 3b, and is engaged with the capstan shaft insertion hole 19 of the bulged portion 16 of the cassette 10. Thus, in the state where the cassette is housed, the stopper member 25 is not left in a state of being deformed for a long period. Therefore, no aged deformation is generated in the stopper member 25, so that the cassette 10 can be securely stored and held in the cassette accommodation case.

Further, the cassette accommodation case 1 has a structure in which the stopper member 25 is once pushed down by the bulged portion 16 of the cassette 10 when the cassette 10 is inserted into the cassette accommodation case 1, and thereafter, is engaged with the capstan shaft insertion hole 19. Thus, even in the case where there is unevenness in a wall thickness of the bulged portion 16 of the cassette 10, the cassette accommodation case 1 permits the unevenness in a wall thickness.

Furthermore, in the cassette accommodation case 1, the engaging protrusion 25a of the stopper member 25 has the distal or tip (front) edge 25$a_1$, which is formed into an inclined surface, and thereby, the engaging protrusion 25a of the stopper member 25 can be smoothly engaged with and released from the capstan shaft insertion hole 19.

Figure 17:
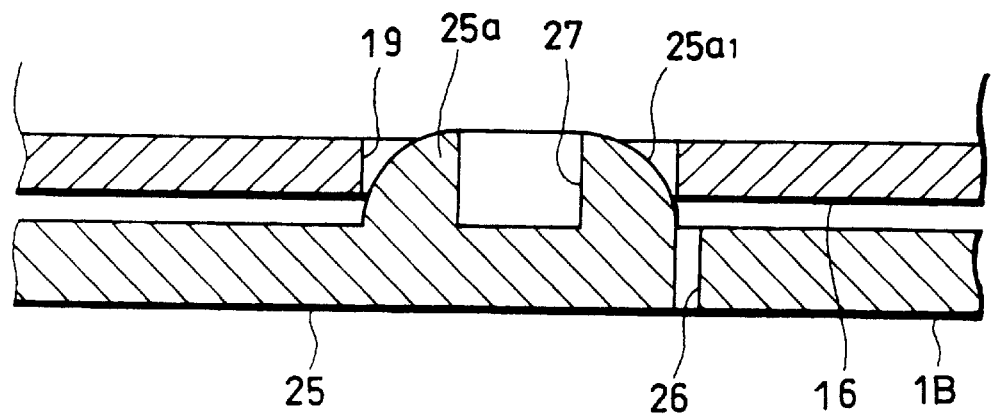
FIG. 17 is an example showing another shape of an engaging protrusion of the stopper member.
Figure 18A:
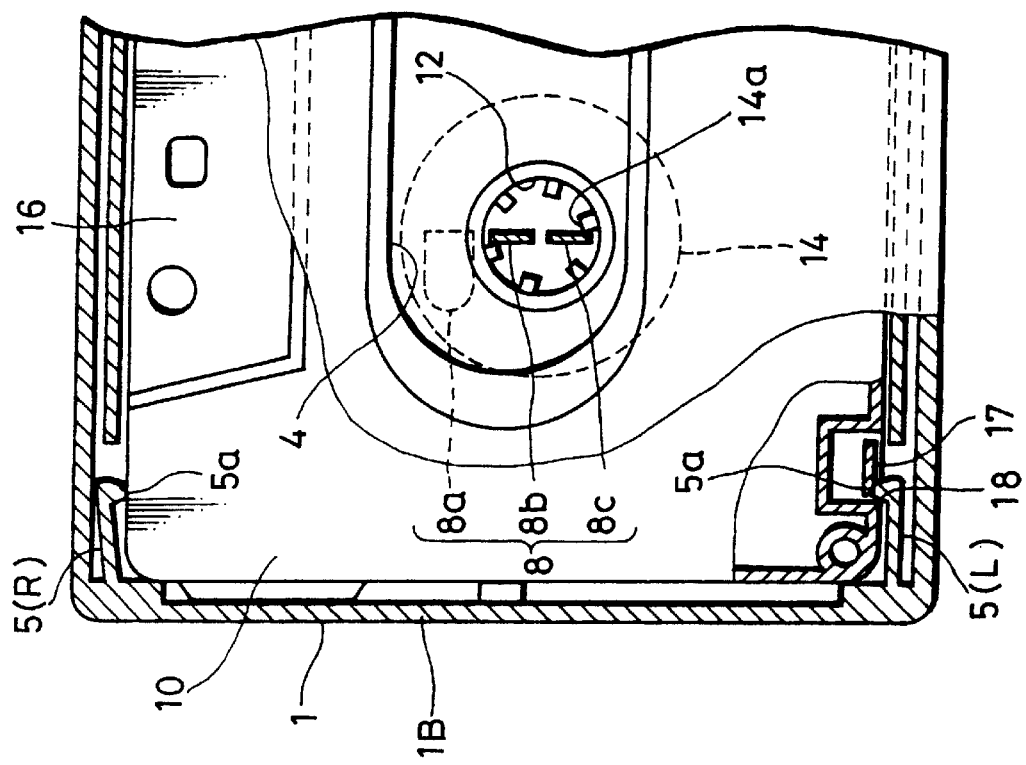
FIG. 18, consisting of FIGS. 18A through 18B, is plan view of the cassette accommodation case of the present invention in which the cassette is in a state being housed therein while a part thereof being cut off.
Figure 18B:
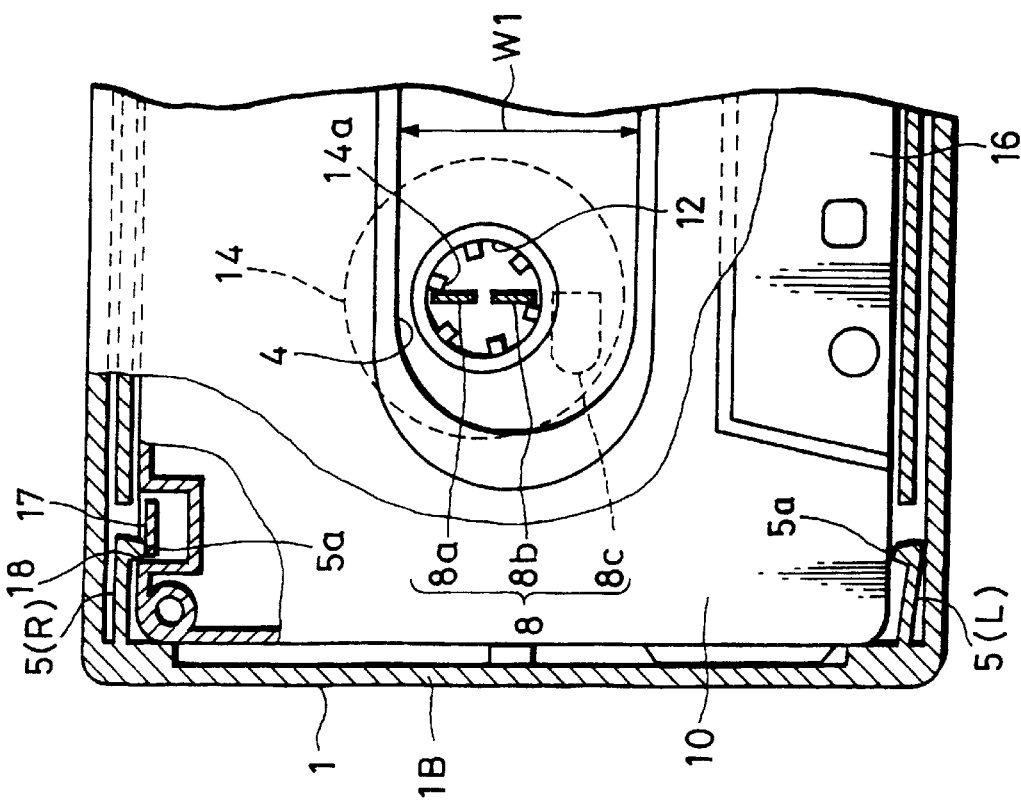

Also, the shape of the distal (front) edge 25$a_1$ of the engaging protrusion 25a of the stopper member 25 may be a curved surface as shown in FIG. 17.

Moreover, the recess groove 27 is formed at the central portion on the distal end of the engaging protrusion 25a of the stopper member 25, and thereby, it is possible to prevent a so-called sink mark (shrinkage) (i.e., deformation by a shrinkage of resin after molding) generated from a structure in which the engaging protrusion 25a is a thick wall. Therefore, the engaging protrusion 25a is securely engaged with the capstan shaft insertion hole 19 of the cassette 10, and also an appearance of the cassette accommodation case 1 can be preferably kept even in the case of viewing the engaging protrusion 25a from the backside of the cassette accommodation case 1.

Further, the cassette accommodation case 1 is provided therein with a rotation stopper member 6 which inhibits a unnecessary rotation of the hub 14 of the cassette 10 so as to prevent a magnetic tape from being slack.

The rotation stopper member 6 is a plastic molding product which is molded of a PP (polypropylene) material, and a base plate 7 is formed with a rotation stopper protrusion 8 corresponding to the hub driving shaft insertion hole 12 of the cassette 10. The rotation stopper protrusion 8 is formed in a state of standing up so as to elastically rise and fall. The base plate 7 is fastened on a fastening (caulking) protrusion 9 projecting from an inner surface of the lower half 1B at approximately the central portion thereof, and thus, the rotation stopper member 6 is attached onto the lower half 1B.

When the cassette 10 is inserted into the cassette accommodation case 1, the rotation stopper protrusion 8 is pushed and falls down by the cassette 10. Then, when the cassette 10 is fully inserted in the cassette accommodation case 1, the hub driving shaft insertion hole 12 of the cassette 10 corresponds to the rotation stopper protrusion 8, and thereby, the rotation stopper protrusion 8 is elastically returned to a state of standing up, and is engaged with an engaging protrusion 14a projected from an inner peripheral surface of the hub 14, and thus, a rotation of the hub 14 can be inhibited.

In the rotation stopper member 6, according to the present embodiment, the rotation stopper protrusion 8 is composed of three projecting pieces 8a, 8b and 8c, and has a structure in which two pieces of them are engaged with the hub 14 so as to inhibit a rotation of the hub 14.

More specifically, as shown in FIG. 15, in a state that the bulged portion 16 is situated on the cassette inserting direction left side and that the cassette 10 is housed in the cassette accommodation case 1, two pieces 8a and 8b of the rotation stopper member 8 are engaged with the engaging protrusion 14a of the hub 14 so as to inhibit a rotation of the hub 14 (at this time, the remaining one piece 8c is in a state of being pushed and falling down by the cassette 10).

On the other hand, as shown in FIG. 15B, in a state that the bulged portion 16 is situated on the cassette inserting direction right side and that the cassette 10 is housed in the cassette accommodation case 1, two pieces 8b and 8c of the rotation stopper member 8 are engaged with the engaging protrusion 14a of the hub 14 so as to inhibit a rotation of the hub 14 (at this time, the remaining one piece 8a is in a state of being pushed and falling down by the cassette 10).

As described above, in the cassette accommodation case 1, even in the case where the cassette 10 is inserted thereinto from whichever directions, it is possible to securely inhibit an unnecessary rotation of the hub 14 by the rotation stopper protrusion 8, and therefore, a magnetic tape is prevented from being slack.

Moreover, in the present embodiment, as is evident from figures, each distal end portion of pieces 8a, 8b and 8c of the rotation stopper protrusion 8 is formed like a curved shape (circular arc). Thus, when inserting the cassette 10 into the cassette accommodation case 1 (or taking it out thereof), even if the cassette 10 is rubbed against the distal end portion of each of the pieces 8a, 8b and 8c, the surface of the cassette 10 is hard to be damaged; in other words, it is effective in protection of the cassette 10.

One preferred embodiment of the present invention has been described above; however, the present invention is not specially limited to the above embodiment.

For example, in the above embodiment, the cassette accommodation case 1 has a structure in which the engaging protrusion 25a of the stopper member 25 is engaged with the capstan shaft insertion hole 19 of the bulged portion 16 of the cassette 10, and thereby, the cassette 10 is held in the cassette accommodation case 1. The cassette accommodation case 1 may has a structure in which the engaging protrusion 25a of the stopper member 25 is engaged with the positioning reference hole 20 of the bulged portion 16 of the cassette 10, and thereby, the cassette 10 is held in the cassette accommodation case 1.

As is evident from the above explanation, in the cassette accommodation case of the present invention, when the cassette is housed in the cassette accommodation case, the stopper member is engaged with the hole of the bulged portion of the cassette, and thereby, the cassette is held in the cassette accommodation case. In such a structure, the stopper member is not left in a state of being deformed for a long period; for this reason, no aged deformation is generated in the stopper member. Therefore, the cassette is securely held in the cassette accommodation case, so that the cassette can be prevented from suddenly jumping out.

Further, with the cassette accommodation case of the embodiment, the width W1 of the opening mouth portion 4 (see FIG. 12) is formed larger than the conventional one.

That is, the width W1 of the opening mouth portion 4 is formed larger, as shown in FIG. 11, than the width dimension W2 for the portion combining a common portion and a non-common portion (diagonally shaded portion) of the hub driving shaft inserting holes 12 and 12' of the two pieces of the cassettes 10 and 10', which are made when the two cassettes 10 and 10' are superposed in respectively reverse orientations and as a result, when the cassette 10 is in a state of being accommodated in the cassette accommodation case 1, in cases where the cassette 10 is inserted in any orientations, there is provided a structure such that the hub driving shaft inserting holes 12 of the cassette 10 are completely exposed from the opening mouth portion 4.

In this manner, with the cassette accommodation case of the embodiment, since the hub driving shaft inserting holes 12 never become states of being hidden even when the cassette 10 is inserted in any orientations, it is possible to smoothly push out the cassette 10 by hooking the finger in the hub driving shaft inserting holes 12 when trying to take out the cassette 10.

Meanwhile, in this embodiment, although the relationship between W1 and W2 is made W1>W2, W1=W2 is also recommendable.

As explained above, in the cassette accommodate case having such a structure in which the cassette is accommodated by being laterally inserted from the inserting mouth portion provided on one side thereof, and inside thereof, the rotation stopping projecting tabs which engage with the hubs in the cassette to prevent its rotation are provided capable of rising and falling, the present invention forms the rotation stopping projecting tabs with two tabs provided parallelly in the cassette inserting direction as a set, so that the hubs can be more surely prevented from unnecessarily rotating and hence provide the cassette accommodation case high in reliability can be provided by the present invention.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A cassette accommodation case for enclosing a cassette which is accommodated by being laterally inserted from an inserting mouth portion provided inside a side surface, thereof, a rotation stopping projecting tab which engages with a hub in the cassette to prevent rotation of said hub, comprising:

a stopper member provided in a notch groove located in said case and comprising a protrusion for engaging with a shaft insertion hole in an upraised portion of said cassette; and said rotation stopping tab further comprising:
      a first and second tab extending perpendicular to an inserting direction of said cassette,
      a base portion with a front end positioned adjacent to said mouth portion of said case extending perpendicular to an inserting direction of said cassette with said first tab extending between said front end of said base and said second tab extending parallel and behind said first tab,
      wherein each tab is pressed down on said base upon insertion of said cassette and elastically rises to contact one inner surface of the hub when said cassette is accommodated within said case.

2. The cassette accommodation case as claimed in claim 1, wherein said rotation stopping projecting tabs have curved ends.

3. A cassette accommodation case having such a structure in which a cassette is accommodated by being laterally inserted from an inserting mouth portion provided on a side surface, and the cassette can be inserted in any orientation, comprising:

on an inner side surface thereof there are formed a rotation stopping tab for engaging with a hub in the cassette to block rotation of the hub and a plurality of concave grooves for accepting a swelled portion of the cassette, said rotation stopping tab further comprising:
      two tabs each having a flat surface with a curved top extending into two side surfaces extending on either side of said flat surface which is wider than the two side surfaces,
      wherein the two tabs are arranged with a flat surface of one of the two tabs facing a flat surface of another of the two tabs in parallel with each other in a cassette inserting direction and being capable of rising and falling relative to insertion of said cassette, said concave grooves being symmetrically formed on left and right sides of the cassette in an inserting direction of said cassette, and
      a stopper member provided in a notch groove located in one of the concave grooves of said case and comprising a protrusion for engaging with a shaft insertion hole in an upraised portion of said cassette.

4. The cassette accommodation case as claimed in claim 3, wherein said rotation stopping tab is projectingly formed on a base member and said base member is fixed to an inner surface of a lower half of the cassette accommodation case.

5. The cassette accommodation case as claimed in claim 3, wherein said stopper member having an engaging convex portion which engages with an aperture formed in the swelled portion of the cassette to hold the cassette within the case.

6. The cassette accommodation case as claimed in claim 5, wherein said stopper member is formed on said left and right sides of said case in said concave grooves.

7. The cassette accommodation case as claimed in claim 3, wherein the cassette has a pair of hub driving shaft inserting holes;
   wherein an opening mouth portion of an upper half of the cassette accommodation case is formed to have sufficient width so that, in any orientation, said opening mouth portion does not contact either of the hub driving shaft inserting holes of the cassette.

8. A cassette case for housing a cassette which is inserted into a side opening of said case, said case having a left and right concave groove for accepting a swelled portion of said cassette in any orientation relative to said cassette, said case comprising:

a stopper member formed in each of said left and right concave grooves of said case; and a stopping tab including a base having two elastic tabs extending perpendicular to an inserting direction of said cassette and said tabs including a first tab extending adjacent the said side opening of said case and a second tab located behind said first tab, wherein said cassette is inserted into said side opening forcing the first then the second tab downward to said base, then each tab rises inside one side of the hub portion of said cassette thus preventing said rotation of said hub portion of said cassette wherein said stopper member includes a protrusion for engaging with a shaft insertion hole in an upraised portion of said cassette, and is respectively provided in a notch groove located in the left and right concave grooves of said case.

* * * * *